US010980048B2

United States Patent
Li et al.

(10) Patent No.: US 10,980,048 B2
(45) Date of Patent: Apr. 13, 2021

(54) CONTENTION BASED SIGNALING IN A WIRELESS COMMUNICATION SYSTEM

(71) Applicant: Telefonaktiebolaget LM Ericsson (publ), Stockholm (SE)

(72) Inventors: Gen Li, Beijing (CN); Robert Baldemair, Solna (SE); Cong Shi, Beijing (CN)

(73) Assignee: Telefonakbebolaget LM Ericsson (Publ), Stockholm (SE)

( * ) Notice: Subject to any disclaimer, the term of this patent is extended or adjusted under 35 U.S.C. 154(b) by 775 days.

(21) Appl. No.: 15/021,992

(22) PCT Filed: Sep. 17, 2015

(86) PCT No.: PCT/CN2015/089896
§ 371 (c)(1),
(2) Date: Mar. 15, 2016

(87) PCT Pub. No.: WO2017/045187
PCT Pub. Date: Mar. 23, 2017

(65) Prior Publication Data
US 2017/0265218 A1  Sep. 14, 2017

(51) Int. Cl.
*H04W 72/12* (2009.01)
*H04W 74/08* (2009.01)

(52) U.S. Cl.
CPC ... *H04W 72/1273* (2013.01); *H04W 74/0808* (2013.01)

(58) Field of Classification Search
CPC .................. H04W 72/1273; H04W 74/0808
(Continued)

(56) References Cited

U.S. PATENT DOCUMENTS

2004/0252662 A1* 12/2004 Cho ................... H04W 74/08
370/329
2007/0104132 A1  5/2007 Rajagopalan et al.
(Continued)

FOREIGN PATENT DOCUMENTS

CN 102612852 A 7/2012
CN 102843654 A 12/2012
(Continued)

OTHER PUBLICATIONS

International Search Report and Written Opinion for International Patent Application No. PCT/CN2015/089896, dated Jun. 15, 2016, 9 pages.
(Continued)

*Primary Examiner* — Paul H Masur
*Assistant Examiner* — Ellen A Kirillova
(74) *Attorney, Agent, or Firm* — Christopher & Weisberg, P.A.

(57) ABSTRACT

This disclosure relates to wireless communication. According to one example embodiment described in this disclosure, a method for contention based signaling is proposed. A network element such as base station monitors a dedicated UL channel to determine whether the dedicated UL channel is occupied by UL data transmissions. In response to a determination that the dedicated UL channel is not occupied by UL transmissions, the network element prioritizes DL data transmissions over the dedicated UL channel.

27 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0044260 A1 | 2/2011 | Narasimha et al. | |
| 2013/0142076 A1* | 6/2013 | Ramos .................. | H04W 24/00 370/254 |
| 2013/0235823 A1* | 9/2013 | Kneckt ............. | H04W 72/0446 370/329 |
| 2013/0322235 A1 | 12/2013 | Khoryaev et al. | |
| 2015/0055589 A1* | 2/2015 | Yerramalli ............ | H04L 1/1822 370/329 |
| 2015/0201429 A1 | 7/2015 | Chen et al. | |

FOREIGN PATENT DOCUMENTS

| | | | |
|---|---|---|---|
| CN | 102572961 B | * | 9/2015 |
| CN | 102572961 B | | 9/2015 |
| WO | 2014187086 A1 | | 11/2014 |
| WO | 2015094048 A1 | | 6/2015 |

OTHER PUBLICATIONS

Ericsson, "R1-153528: Summary of the Coexistence Evaluation Results for DL+UL LAA," 3rd Generation Partnership Project (3GPP), TSG RAN WG1 Meeting #81, May 24-29, 2015, 23 pages, Fukuoka, Japan.

Intel et al., "R1-153565: WF on LAA UL LBT," 3rd Generation Partnership Project (3GPP), TSG RAN WG1 #81, May 25-29, 2015, 4 pages, Fukuoka, Japan.

Interdigital Communications, "R1-154464: Coexistence evaluation results for Wi-Fi and UL+DL LAA," 3rd Generation Partnership Project (3GPP), TSG-RAN WG1 Meeting #82, Aug. 24-28, 2015, 13 pages, Beijing, China.

International Search Report and Written Opinion for International Patent Application No. PCT/SE2016/050845, dated Nov. 30, 2016, 20 pages.

* cited by examiner

US 10,980,048 B2

CONTENTION BASED SIGNALING IN A WIRELESS COMMUNICATION SYSTEM

This application is a 35 U.S.C. § 371 national phase filing of International Application No. PCT/CN2015/089896, filed Sep. 17, 2015, the disclosure of which is incorporated herein by reference in its entirety.

TECHNICAL FIELD

The present disclosure generally relates to contention based signaling in a wireless communication system. More particularly, embodiments described herein relate to methods, network elements (e.g., base stations and user equipment), computer program and systems for contention based signaling.

BACKGROUND

Wireless communication systems may be classified into at least two categories depending on the technique used to gain access to resources of a communication channel, i.e. i) contention based systems and ii) scheduled systems.

In contention based systems, network elements such as user equipment (UE) typically obtain transmission opportunities by sending competing requests for channel resources. This may be implemented by allowing a UE to send a request to obtain a transmission opportunity, at a time of its choice or as calculated by an algorithm that randomizes transmission times. The UE may e.g. transmit such a request only when it is sensed that the communication channel is not being used by other UEs. Typically, multiple UEs may send competing requests and transmission opportunities may be granted to a UE whose request was first to be received uncorrupted. An example of a contention based system is a wireless local area network (WLAN) according to the IEEE 802.11 family of standards. The IEEE 802.11 family of standards typically uses carrier sense multiple access protocol with collision avoidance (CSMA/CA) protocol to enable contention based access.

In scheduled systems on the other hand, specific channel resources are allocated for requesting transmission opportunities. UEs that are granted transmission opportunities are indicated via a message sent by a network node, such as base station. The message may also indicate specific resources for use by the UEs. Such a message may be called a schedule grant message. The schedule grant message is typically delivered to a UE that has earned a transmission opportunity to ensure good operation of the wireless communication network. If the scheduled grant message is lost, the UE generally has no means to know of the allocated resources and thereby these resources may become wasted. Additionally, scheduled systems may operate in licensed frequency bands to reduce interference. Examples of scheduled systems include most cellular systems including e.g. those based upon 3GPP Long Term Evolution (LTE) specifications.

In the future, it is anticipated that approximately 50 billion electronic devices (e.g., UEs and other devices) may be connected. In other words, the next generation of wireless communication systems (such as the fifth generation, also known as 5G) will have to cope with a massive growth of the number of devices and, hence, also the increased traffic volume caused by the increased number of devices. At the same time, users of the above-mentioned devices demand that information can be accessed and shared by anyone, anywhere and anytime. In view of these trends and demands, it is also anticipated that the performance requirements will become stricter when operation in licensed bands (such as most cellular systems) is to co-exist with operation in non-licensed bands (such as most WLANs).

SUMMARY

It is in view of the above considerations and others that the various embodiments disclosed herein have been made. A general object is to provide for improved resource utilization in a wireless communication system.

According to a first aspect, there is provided a method for contention based transmission of downlink (DL) data performed by a network element. A dedicated uplink (UL) channel is monitored to determine whether the dedicated UL channel is occupied by UL data transmissions. In response to a determination that the dedicated UL channel is not occupied by UL transmissions, DL data transmissions are prioritized over the dedicated UL channel. Else, i.e. upon determining that the dedicated UL channel is occupied by UL transmissions, UL data transmissions can be prioritized over the dedicated UL channel.

In response to a determination that the dedicated UL channel is not occupied by UL transmissions, DL data transmissions may be initiated, or otherwise triggered, over the dedicated UL channel. Furthermore, DL data may be transmitted over the dedicated UL channel.

In some advantageous embodiments, only a limited duration at the beginning of the dedicated UL channel is monitored to determine whether the dedicated UL channel is occupied by UL data transmissions.

In a particularly advantageous embodiment, there is provided a method for contention based transmission of DL data performed by a network element. A dedicated UL channel is monitored for a certain period of time to determine whether the dedicated UL channel is occupied by UL data transmissions. In response to a determination that the dedicated UL channel is not occupied by UL transmissions during said certain period of time, the method may additionally comprise listening to the dedicated UL channel and initiating a random backoff to prepare for DL data transmissions. Furthermore, in response to a determination that UL data is received, UL transmissions are prioritized over the dedicated UL channel. Else, i.e. in response to a determination that no UL data is received, DL data transmissions are initiated, or otherwise triggered, over the dedicated UL channel. DL data may thus be transmitted over the dedicated UL channel. As will be appreciated, and in accordance with some of the embodiments disclosed herein, the expression 'prioritizing DL transmission' may hence include preparing for DL data transmissions over the dedicated UL channel and/or initiating, or otherwise triggering, DL data transmission over the dedicated UL channel.

For example, the above-mentioned dedicated UL channel may be a Contention Based Access Channel (CBACH).

This aspect allows for a mechanism where UL transmission and DL transmission can co-exist over the dedicated UL channel (e.g., the CBACH). In turn, this may extend the usage of the dedicated UL channel (e.g., the CBACH). In the existing art, the dedicated UL channel is used for UL transmissions only. This disclosure recognizes the fact that, in many scenarios, no or little UL data is in fact transmitted during the entire duration of the dedicated UL channel. This typically leaves resources unused and, hence, leads to a potential waste of resources. The above-mentioned first aspect allows for a mechanism to prioritize between UL transmissions and DL transmissions, respectively, depending on a current UL usage of the dedicated UL channel. In situations where the dedicated UL channel is not occupied, the suggested approach allows for prioritizing DL data transmissions instead. Hereby it is made possible to improve the resource utilization.

According to a second aspect, there is provided a network element, such as network node (e.g., a base station) for contention based transmission of DL data. The network element comprises means adapted to monitor a dedicated UL channel (e.g., a CBACH) to determine whether the dedicated UL channel is occupied by UL data transmissions. The network element may also comprise means adapted to prioritize DL data transmissions over the dedicated UL channel in response to a determination that the dedicated UL channel is not occupied by UL transmissions. Also, the network element may comprise means adapted to initiate DL data transmissions over the dedicated UL channel in response to a determination that the dedicated UL channel is not occupied by UL transmissions. Still further, the network element may comprise means adapted to transmit DL data over the dedicated UL channel.

In an advantageous embodiment, the network element may comprise: i) means adapted to monitor the dedicated UL channel during a certain period of time to determine whether the dedicated UL channel is occupied by UL data transmissions, ii) means adapted to listen to the dedicated UL channel and to initiate a random backoff to prepare for DL data transmissions in response to a determination that the dedicated UL channel is not occupied by UL transmissions during said certain period of time, iii) means adapted to prioritize UL transmissions over the dedicated UL channel in response to a determination that UL data is received, iv) and means adapted to initiate DL data transmissions over the dedicated UL channel in response to a determination that no UL data is received.

The second aspect may allow for the same or similar effects and advantages as the earlier-mentioned first aspect.

In one example implementation, there is provided a network element for contention based transmission of DL data, wherein the network element comprises a processor and memory, and wherein the memory comprises instructions executable by the processor whereby the network element is operative to perform the earlier-mentioned method according to the first aspect. To this end, the network element may comprise a processor and memory, wherein the memory comprises instructions executable by the processor whereby the network element is operative to monitor a dedicated UL channel (e.g., CBACH) to determine whether the dedicated UL channel is occupied by UL data transmissions; and in response to a determination that the dedicated UL channel is not occupied by UL transmissions, prioritize DL data transmissions over the dedicated UL channel. Advantageously, the memory comprises instructions executable by the processor whereby the network element is operative to monitor the dedicated UL channel during a certain period of time; and in response to a determination that the dedicated UL channel is not occupied by UL transmissions during said certain period of time: listen to the dedicated UL channel and initiate a random backoff to prepare for DL data transmissions; and in response to a determination that UL data is received, prioritize UL transmissions over the dedicated UL channel; else, i.e. in response to a determination that no UL data is received, initiate DL data transmissions over the dedicated UL channel.

In another example implementation, there is provided a network element for contention based transmission of DL data, wherein the network element comprises a monitoring module for monitoring a dedicated UL channel (e.g., CBACH) to determine whether the dedicated UL channel is occupied by UL data transmissions; and a prioritization module for prioritizing DL data transmissions over the dedicated UL channel in response to a determination that the dedicated UL channel is not occupied by UL transmissions. A DL transmission initiating module may also be provided for initiating DL data transmissions over the dedicated UL channel in response to a determination that the dedicated UL channel is not occupied by UL transmissions. Furthermore, there may be provided a transmitter for transmitting DL data over the dedicated UL channel.

Advantageously, but not necessarily, the network element comprises a monitoring module for monitoring the dedicated UL channel during a certain period of time; a DL preparation module for listening to the dedicated UL channel and initiating a random backoff to prepare for DL data transmissions, in response to a determination that the dedicated UL channel is not occupied by UL transmissions during said certain period of time; a UL prioritization module for prioritizing UL transmissions over the dedicated UL channel, in response to a determination that UL data is received, and a DL initiation module for initiating DL data transmissions over the dedicated UL channel, in response to a determination that no UL data is received.

According to still another aspect, there is provided a method of contention based transmission of DL data in a system comprising at least one first network element (e.g., a at least one UE) and a second network element (e.g., a network node such as a base station). The method comprises the second network element monitoring a dedicated UL channel to determine whether the dedicated UL channel (e.g., CBACH) is occupied by UL data transmissions from any one of the at least one first network element; and in response to a determination that the dedicated UL channel is not occupied by UL transmissions, the second network element prioritizing DL data transmissions to one or more of the at least one first network element over the dedicated UL channel. This aspect may exhibit the same or similar effects and advantages as earlier-described aspects.

According to yet another aspect, there is provided a system for contention based transmission of DL data, the system comprising at least one first network element (e.g., a at least one UE) and a second network element (e.g., a network node such as a base station). The second network element is adapted to monitor a dedicated UL channel (e.g., CBACH) to determine whether the dedicated UL channel is occupied by UL data transmissions from any one of the at least one first network element; and in response to a determination that the dedicated UL channel is not occupied by UL transmissions, the second network element is adapted to prioritize DL data transmissions to one or more of the at least one first network element over the dedicated UL channel. This aspect may exhibit the same or similar effects and advantages as earlier-described aspects.

Still further, another aspect relates to computer program, comprising instructions which, when executed on at least one processor, cause the at least one processor to carry out the method according to the earlier-mentioned first aspect. A carrier comprising the computer program may also be provided. This carrier may, for example, be one of an electronic signal, an optical signal, a radio signal, or computer readable storage medium. This aspect may exhibit the same or similar effects and advantages as earlier-described aspects.

In yet another aspect, there is provided a method for contention based signaling, the method being performed by a network element such as a UE. Configuration parameters for allowing the UE to perform contention-based signaling over a dedicated UL channel (e.g., a CBACH) are accessed, e.g. received from a network element such as a network node (e.g., a base station). Furthermore, it is determined whether the dedicated UL channel is to be used for contention-based signaling. In response to a determination that the dedicated UL channel is to be used for contention-based signaling, UL data is transmitted to a network element. Else, in response to a determination that the dedicated UL channel is not to be used for contention-based signaling, the method comprises initiating a listening of the dedicated UL channel to determine whether DL data intended for the UE is received from the network element over the dedicated UL channel. This aspect may exhibit the same or similar effects and advantages as earlier-described aspects.

In a further aspect, computer program comprising instructions which, when executed on at least one processor, cause the at least one processor to carry out the above-mentioned method is also provided. A carrier comprising the computer program may also be provided. The carrier may e.g. be one of an electronic signal, an optical signal, a radio signal, or computer readable storage medium. This aspect may exhibit the same or similar effects and advantages as earlier-described aspects.

In still another aspect, there is provided a UE for contention based signaling. The UE comprises: means adapted to access configuration parameters for allowing the UE to perform contention-based signaling over a dedicated UL channel (e.g., CBACH); means adapted to determine whether the dedicated UL channel is to be used for contention-based signaling; means adapted to transmit UL data to a network element, in response to a determination that the dedicated UL channel is to be used for contention-based signaling; and means adapted to initiate a listening of the dedicated UL channel to determine whether DL data intended for the UE is received from the network element over the dedicated UL channel, in response to a determination that the dedicated UL channel is not to be used for contention-based signaling. The UE may also comprise means adapted to receive the configuration parameters from the network element. This aspect may exhibit the same or similar effects and advantages as earlier-described aspects.

In one example implementation, the UE comprises a processor and a memory, wherein the memory comprises instructions executable by the processor whereby the network element is operative to: access configuration parameters for allowing the UE to perform contention-based signaling over a dedicated UL channel (e.g., CBACH); determine whether the dedicated UL channel is to be used for contention-based signaling; and in response to a determination that the dedicated UL channel is to be used for contention-based signaling, transmitting UL data to a network element; else in response to a determination that the dedicated UL channel is not to be used for contention-based signaling, initiating a listening of the dedicated UL channel to determine whether DL data intended for the UE is received from the network element over the dedicated UL channel. Optionally, the memory may further comprise instructions executable by the processor whereby the network element is operative to receive the configuration parameters from the network element.

In yet another example implementation, there is provided a UE for contention based signaling, the UE comprising: a configuration module for accessing configuration parameters for allowing the UE to perform contention-based signaling over a dedicated UL channel (e.g., CBACH); a determination module for determining whether the dedicated UL channel is to be used for contention-based signaling; and a transmitter for transmitting UL data to a network element, in response to a determination that the dedicated UL channel is to be used for contention-based signaling; and a channel listening module for initiating a listening of the dedicated UL channel to determine whether DL data intended for the UE is received from the network element over the dedicated UL channel, in response to a determination that the dedicated UL channel is not to be used for contention-based signaling. Optionally, the UE may also include a receiver for receiving the configuration parameters from the network element.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1:
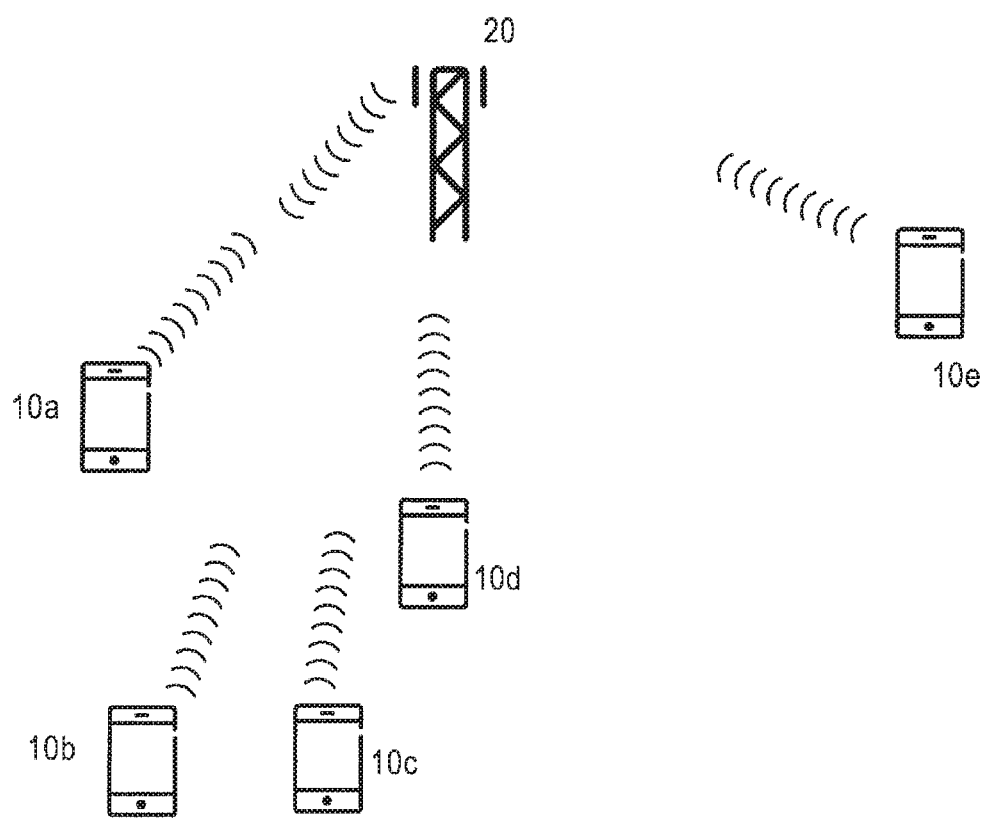
FIG. 1 schematically illustrates a wireless communication system including first network elements exemplified by several user equipment, UE, and a second network element exemplified by a network node.

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, it is a general object of the embodiments described herein to improve the resource utilization in a wireless communication system.

To address this, in accordance with an embodiment, described herein are a method and a network element such as a network node (e.g., a base station) for contention based signaling. A dedicated UL channel, such as a CBACH, is monitored to determine whether this dedicated UL channel is occupied by UL data transmissions. In response to a determination that the dedicated UL channel is not occupied by UL transmissions, DL data transmissions are prioritized over the dedicated UL channel. In other words, in response to a determination that the dedicated UL channel is not occupied by UL transmissions, it is possible to prepare for DL data transmission and hence DL data transmission contention may be initiated, or otherwise triggered. Else, i.e. upon determining that the dedicated UL channel is occupied by UL transmissions, UL data transmissions can be prioritized over the dedicated UL channel.

For example, and in accordance with one advantageous embodiment, the dedicated UL channel is monitored for a certain (e.g., pre-defined) period of time to determine whether the dedicated UL channel is occupied by UL data transmissions. In response to a determination that the dedicated UL channel is not occupied by UL transmissions during said certain period of time, the method may additionally comprise listening to the dedicated UL channel and, optionally also, initiating a random backoff to prepare for DL data transmissions. Furthermore, in response to a determination that UL data is received, UL transmissions are prioritized over the dedicated UL channel. Else, i.e. in response to a determination that no UL data is received, DL data transmissions are initiated, or otherwise triggered, over the dedicated UL channel. DL data may thus be transmitted over the dedicated UL channel. As will be appreciated, and in accordance with some of the embodiments disclosed herein, the expression 'prioritizing DL transmission' may hence include preparing for DL data transmissions over the dedicated UL channel and/or initiating DL data transmission over the dedicated UL channel.

In an interrelated network element (e.g., a UE), configuration parameters may be accessed (e.g. received from a network element such as network node (e.g., a base station)) for allowing the UE to perform contention-based signaling over a dedicated UL channel, such as a CBACH. It is further determined whether the dedicated UL channel is to be used for contention-based signaling. In response to a determination by the UE that the dedicated UL channel is to be used for contention-based signaling, UL data is transmitted to a network element. Else, i.e. in response to a determination by the UE that the dedicated UL channel is not to be used for UL transmission, the method further includes initiating a listening of the dedicated UL channel to determine whether DL data intended for the UE is received from the network element over the dedicated UL channel.

Hereby, it is made possible to achieve a mechanism where UL transmission and DL transmission can co-exist over the dedicated UL channel (e.g., the CBACH). This may extend the usage of the dedicated UL channel (e.g., the CBACH). In the existing art, the dedicated UL channel is used for UL signaling only. This disclosure recognizes the fact that, in many scenarios, no or little UL data is in fact transmitted during the entire duration of the dedicated UL channel. This typically leaves resources unused and, hence, leads to a potential waste of resources. The approach described herein instead allows for a mechanism to prioritize between UL transmissions and DL signaling, respectively, depending on a current UL usage of the dedicated UL channel. In situations where the dedicated UL channel is not occupied, the suggested approach enables a prioritization of DL data transmissions. Hereby it is made possible to improve the resource utilization. This may become particularly useful in future wireless communication systems, such as 5G, where the increased number of devices as well as the increased data traffic volume are foreseen to result in a demand of increasingly efficient usage of resources.

As a way of introduction to the embodiments disclosed herein, FIG. 1 illustrates an example wireless communication system. The wireless communication system may comprise one or more first network elements 10a-e. The one or several first network elements 10a-e are embodied as user equipment (UE) in this example. A UE may for example be a device such as a mobile terminal, a user terminal, a mobile phone, a wireless user terminal, a computer, a laptop computer, a tablet computer, a personal digital assistant, a media device, to name a few examples. It is envisaged that a first network element 10a-e can alternatively be embodied as a different device, which does not necessarily involve human interaction. Examples of devices that do not necessarily involve human interaction are Machine-Type-Communication (MTC) devices and Machine-to-Machine (M2M) devices. As used herein, the expression UE is used to mean any one of the above-mentioned example devices. Hence, for the purpose of this disclosure, the expression UE covers both devices which involve human interaction and devices which do not necessarily involve human interaction. Furthermore, a second network element 20 may be provided. The second network element 20 is exemplified as a network node, e.g. in the form of a base station. Sometimes, the second network element can be referred to as a Radio Base Station (RBS), a NodeB (NB), or an evolved NodeB (eNB).

As a way of further introduction to the embodiments described in this disclosure, reference is made to the international patent application publication WO2015/094048A1. One of the co-inventors of this disclosure is also listed as one of the co-inventors of the subject-matter described in WO2015/094048A1. WO2015/094048A1 describes an improved contention-based access channel signaling and principles, approaches and techniques described in WO2015/094048A1 may advantageously be applied together with principles, approaches and techniques described in this disclosure. The content of WO2015/094048A1 is therefore incorporated herein by reference to give context to this disclosure.

Figure 2:
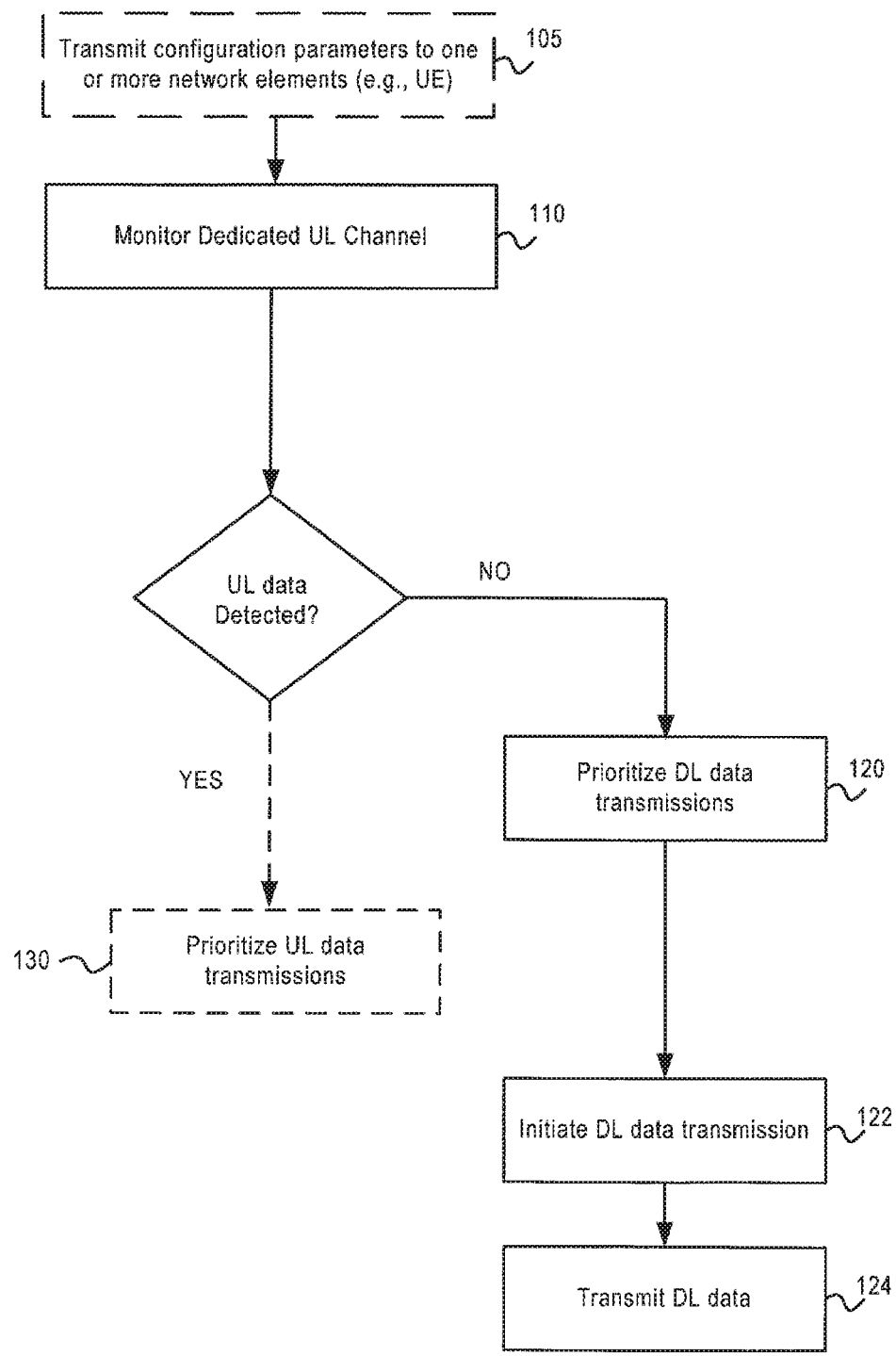
FIG. 2 is a flowchart illustrating a method executable by a network element such as a base station, in accordance with an embodiment.

Turning now to FIG. 2, a flowchart of an embodiment of a method 100 executable by a network element 20 (e.g., a base station) will be described in further detail. Optionally, configuration parameters may initially be transmitted 105 to one or more network elements such as UE 10a-e. The configuration parameters may e.g. include information about contention based access channel resources (e.g., CBACH resource zone(s)) and/or other relevant contention parameters. The configuration parameters may e.g. be transmitted to the one or more UE by broadcast signaling or, alternatively, by RRC (Radio Resource Control) signaling. A dedicated UL channel, e.g. a Contention Based Access Channel (CBACH), is monitored 110 to determine or otherwise detect whether the dedicated UL channel is occupied by UL data transmissions. Upon a determination that the dedicated UL channel is not occupied by UL transmissions, DL data transmissions are prioritized 120 over the dedicated UL channel. Else, i.e. upon a determination that the dedicated UL channel is occupied by UL transmissions, UL data transmissions can be prioritized 130.

In some advantageous embodiments, the dedicated UL channel is monitored 110 only for a limited duration at the beginning of the dedicated UL channel. In other words, it is not necessary to monitor 110 the dedicated UL channel for an unnecessary long period of time. Instead, it may be sufficient to focus the monitoring 110 of the dedicated UL channel for only a limited period of time at the beginning of the dedicated UL channel.

In response to a determination that the dedicated UL channel is not occupied by UL transmissions, DL data transmissions may be initiated 122, or otherwise triggered, over the dedicated UL channel. Also, DL data can be transmitted 124 over the dedicated UL channel.

Figure 3:
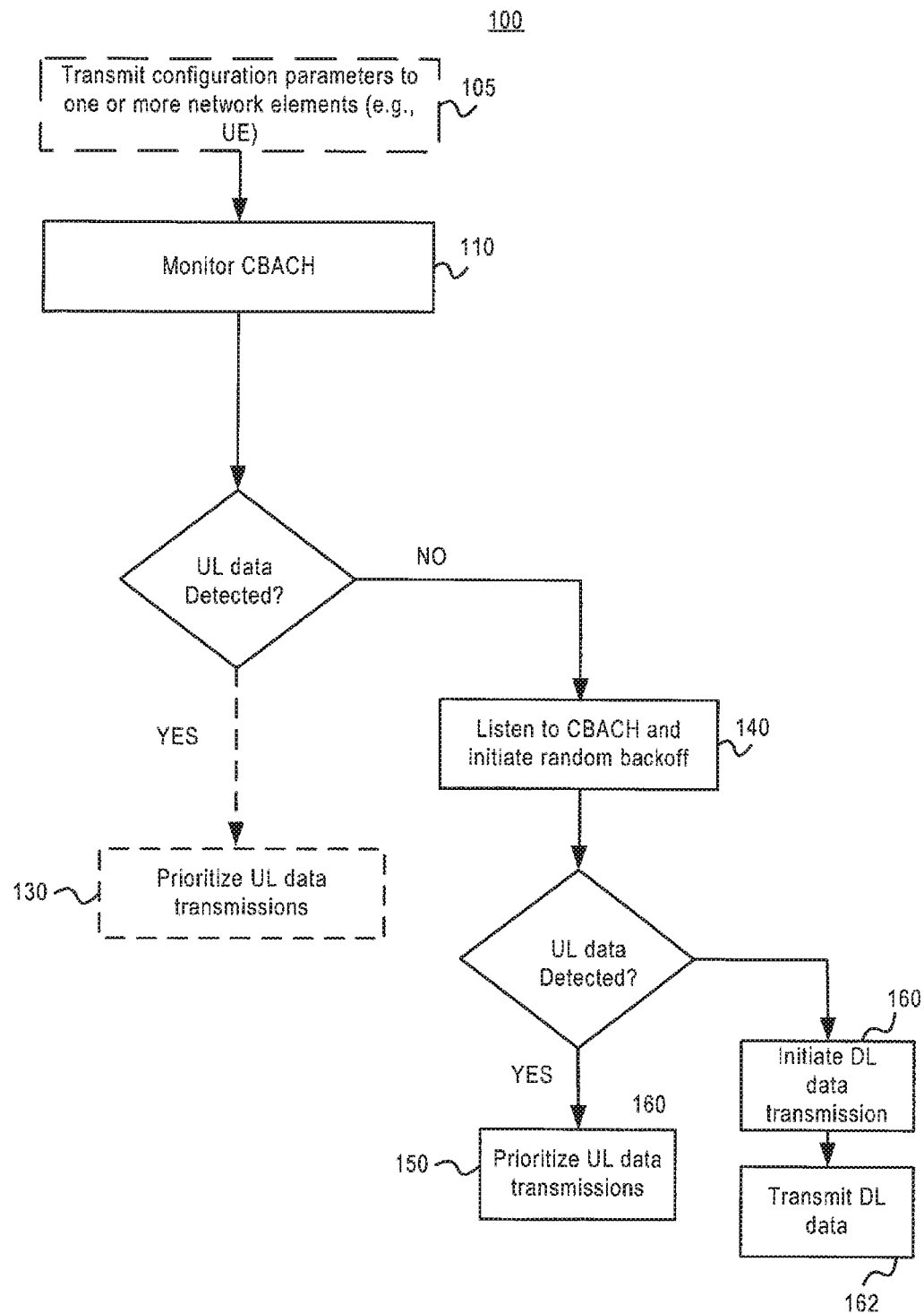
FIG. 3 is a flowchart illustrating a method executable by a network element such as a base station, in accordance with another embodiment.

FIG. 3 is a flowchart of another embodiment of a method 100 executable by a network element 20 (e.g., a base station). Optionally, configuration parameters may initially be transmitted 105 to one or more network elements such as UE 10a-e. The configuration parameters may include information about contention based channel resources (e.g., CBACH resource zone(s)) and/or other relevant contention parameters. The configuration parameters may e.g. be transmitted to the one or more UE by broadcast signaling or, alternatively, by RRC (Radio Resource Control) signaling. The dedicated UL channel, here exemplified by a CBACH, is monitored 110 during a certain period of time. This certain period of time may be a pre-defined period of time. As a mere example, if the length of the CBACH is 2 milliseconds, this pre-defined period of time may e.g. be set to 50 microseconds. In response to a determination that the dedicated UL channel is not occupied by UL transmissions during the above-mentioned certain period of time, the method continues by listening 140 to the dedicated UL channel. Furthermore, random backoff can be initiated to prepare for DL data transmissions. In response to a determination that UL data is received, UL transmissions are prioritized 150 over the dedicated UL channel. Hence, UL data can be received. Else, i.e. in response to a determination that no UL data is received, the method continues by initiating 160 DL data transmissions over the dedicated UL channel. As will be appreciated, DL data may then be transmitted 162 over the dedicated UL channel. For example, if or when a random backoff counter becomes zero, it is possible to initiate 160 DL data transmission to those UEs that are configured to receive DL data transmissions over the dedicated UL channel.

Figure 4:
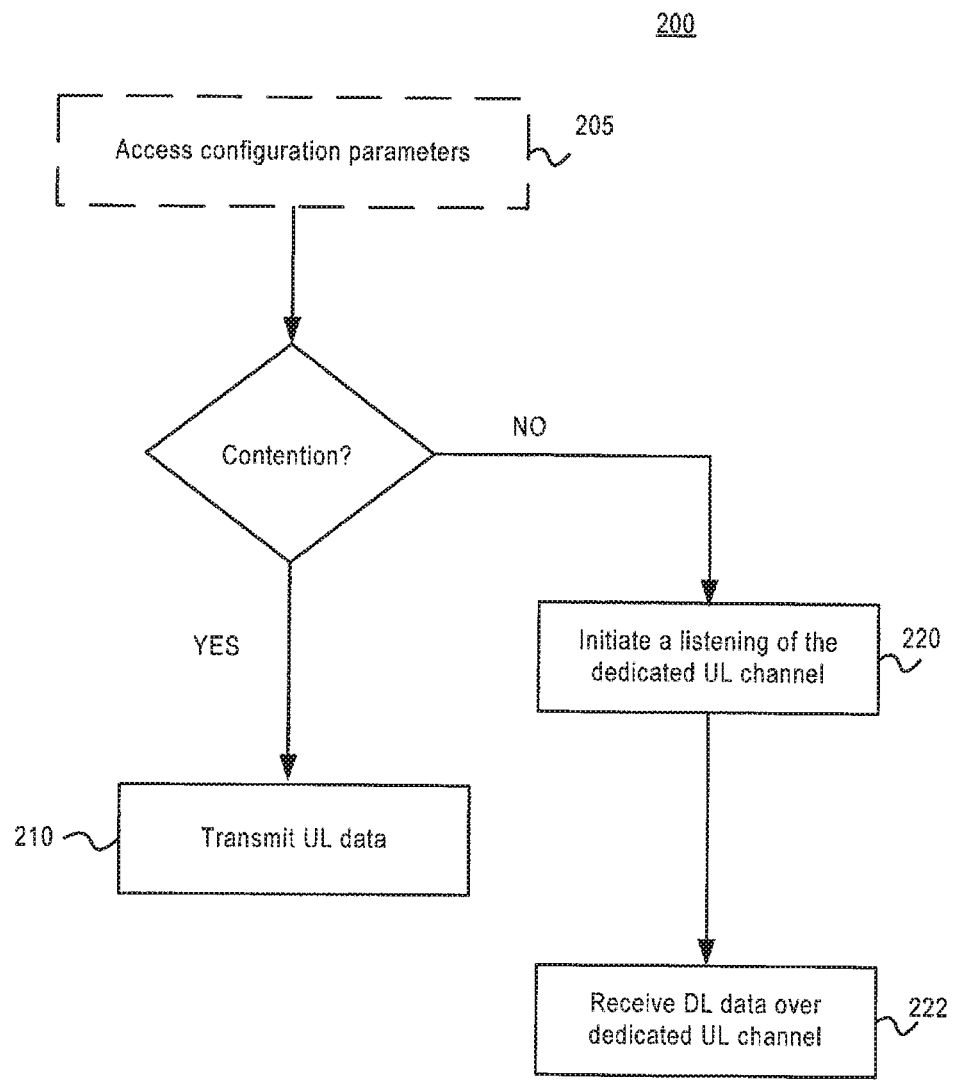
FIG. 4 is a flowchart illustrating a method executable by a network element such as a UE, in accordance with an embodiment.

FIG. 4 is a flowchart of an embodiment of a method 200 executable by an interrelated network element 10 (e.g., a UE). In the following, the interrelated network element 10 will be referred to as a UE in order to facilitate the reading of the disclosure. Optionally, configuration parameters for allowing the UE to perform contention-based signaling over a dedicated UL channel (here exemplified by a CBACH) are accessed 205. The configuration parameters may include information about contention based channel resources (e.g., CBACH resource zone(s)) and/or other relevant contention parameters. In some embodiments, the configuration parameters are accessed 205 by receiving the configuration parameters from a network element 10, e.g. a network node (e.g., a base station). For instance, the configuration parameters may be received on by means of broadcast signaling or, alternatively, by means of RRC (Radio Resource Control) signaling. As can be seen in FIG. 4, it is determined, or otherwise decided, whether the dedicated UL channel is to be used for contention-based signaling. In response to a determination that the dedicated UL channel is to be used for contention-based signaling, UL data is transmitted 210 to a network element. In other words, if or when contention is successful, then, UL data can be transmitted to the network element 20. On the other hand, in response to a determination that the dedicated UL channel is not to be used for contention-based signaling, the method may instead continue by initiating 220 a listening of the dedicated UL channel to determine whether DL data intended for the UE is received from the network element over the dedicated UL channel. Hence, DL data may be subsequently received 222 over the dedicated UL channel. In other words, if or when the contention is not successful (thus, UL data transmission is not prioritized) and if there are scheduled resources available, then it is possible for a configured UE to receive DL data from the network element 20 over the dedicated UL channel.

As will be appreciated from the above, the various embodiments described with reference to FIGS. 1-4 allow for a achieving a mechanism where UL and DL transmission can co-exist over a dedicated UL channel, such as the CBACH. In turn, this may extend the usage of the CBACH. In the existing art, the CBACH is used solely for UL signaling. The embodiments described with respect to FIGS. 1-4 recognize the fact that, in many scenarios, no or little UL data is in fact transmitted during the entire duration of the CBACH. This typically leaves resources unused and, hence, leads to a potential waste of resources. A contrasting idea with the embodiments described with respect to FIGS. 1-4 is to prioritize between UL transmissions and DL signaling, respectively, depending on a current UL usage of the dedicated UL channel.

In situations where the dedicated UL channel is not occupied by UL data transmission (i.e., when resources may be available), DL data transmissions may be prioritized over UL data transmission. Hereby it is made possible to improve the resource utilization. As described earlier, this may be beneficial in future wireless communication systems (such as 5G) where the increased number of devices and the increased data traffic volume are foreseen to result in a demand of increasingly efficient usage of resources.

Figure 5:
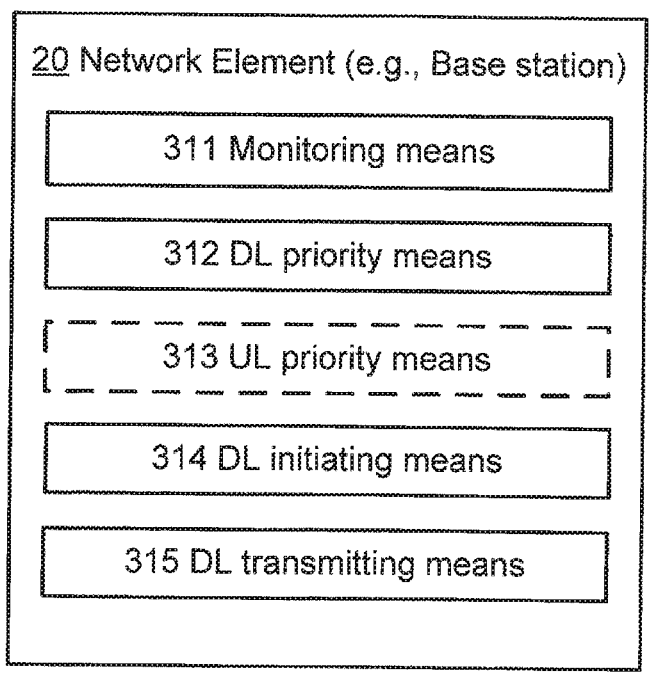
FIG. 5 is a block diagram of a network element embodied as a base station, in accordance with an embodiment.

In the following disclosure, various embodiments of apparatuses will be described in more detail. With reference to FIG. 5, a first embodiment of the network element 20 is shown. The network element 20 is embodied as a network node, such as a base station. The network element 20 comprises a means 311 adapted to monitor a dedicated UL channel (e.g., a CBACH) to determine whether the dedicated UL channel is occupied by UL data transmissions. Optionally, the means 311 adapted to monitor the dedicated UL channel is further adapted to monitor only a limited duration at the beginning of the dedicated UL channel to determine whether the dedicated UL channel is occupied by UL data transmissions. Furthermore, the network element 20 comprises means 312 adapted to prioritize DL data transmissions over the dedicated UL channel in response to a determination that the dedicated UL channel is not occupied by UL transmissions. The network element 20 may also comprise means 313 adapted to prioritize UL data transmissions in response to a determination that the dedicated UL channel is occupied by UL transmissions. Moreover, the network element 20 may comprise means 314 adapted to initiate DL data transmissions over the dedicated UL channel in response to a determination that the dedicated UL channel is not occupied by UL transmissions. Still further, the network element 20 may comprise means 315 adapted to transmit DL data over the dedicated UL channel.

Figure 6:
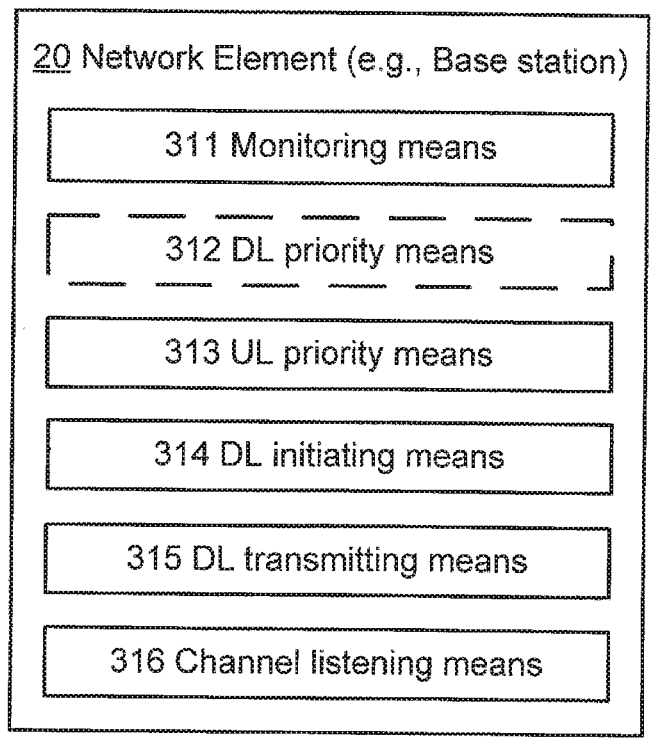
FIG. 6 is a block diagram of a network element embodied as a base station, in accordance with another embodiment.

Turning now to FIG. 6, another embodiment of the network element 20 is shown. Again, the network element 20 is embodied as a network node, such as a base station. The network element 20 comprises means 311 adapted to the monitor the dedicated UL channel (e.g., CBACH) during a certain, e.g. pre-defined, period of time to determine whether the dedicated UL channel is occupied by UL data transmissions. Furthermore, the network element 20 comprises means 316 adapted to listening to the dedicated UL channel. The means 316 may also be adapted to initiate a random backoff to prepare for DL data transmissions in response to a determination that the dedicated UL channel is not occupied by UL transmissions during said certain period of time. Alternatively, the latter function of initiating the random backoff is performed by separate means (not shown), which are separate from the means denoted 316. Alternatively, the functions of the means denoted 316 could be performed by the means denoted 311. Still further, the network element 20 comprises means 313 adapted to prioritize UL transmissions over the dedicated UL channel in response to a determination that UL data is received. Also, the network element 20 comprises means 314 adapted to initiate DL data transmissions over the dedicated UL channel in response to a determination that no UL data is received. Hence, means 315 adapted to transmit DL data may also be provided.

Figure 7:
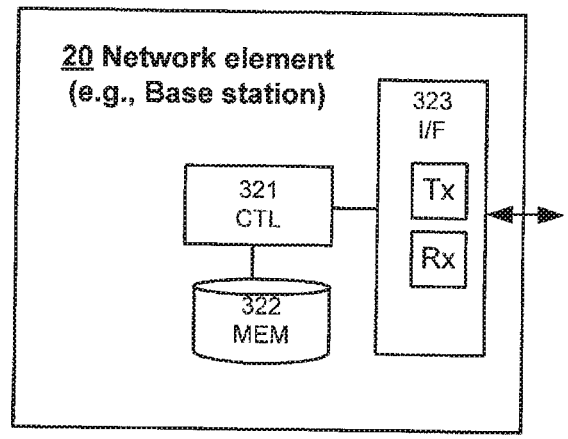
FIG. 7 is a block diagram of a network element embodied as a base station, in accordance with an example implementation.

FIG. 7 illustrates an example implementation of the network element 20. The network element comprises at least one processor 321 and at least one memory 322. The at least one memory 322 comprises instructions executable by the at least one processor 321 whereby the network element 20 is operative to monitor a dedicated UL channel (e.g., CBACH) to determine whether the dedicated UL channel is occupied by UL data transmissions; and in response to a determination that the dedicated UL channel is not occupied by UL transmissions, prioritize DL data transmissions over the dedicated UL channel. Furthermore, the at least one memory 322 comprises instructions executable by the processor 321 whereby the network element 20 is operative to, in response to a determination that the dedicated UL channel is not occupied by UL transmissions, initiate DL data transmissions over the dedicated UL channel. As can be seen in FIG. 7, the network element 20 may further comprise a communications interface 323 including a transmitter Tx and/or a receiver Rx. A transmitter Tx a may be provided to transmit DL data over the dedicated UL channel. In some embodiments, the at least one memory 322 comprises instructions executable by the at least one processor 321 whereby the network element 20 is operative to monitor only a limited duration at the beginning of the dedicated UL channel to determine whether the dedicated UL channel is occupied by UL data transmissions. In an advantageous embodiment, the at least one memory 322 comprises instructions executable by the at least one processor 321 whereby the network element 20 is operative to monitor the dedicated UL channel during a certain period of time; and in response to a determination that the dedicated UL channel is not occupied by UL transmissions during said certain period of time: listen to the dedicated UL channel and initiate a random backoff to prepare for DL data transmissions; and in response to a determination that UL data is received, prioritize UL transmissions over the dedicated UL channel, else in response to a determination that no UL data is received, initiate DL data transmissions over the dedicated UL channel.

Figure 8:
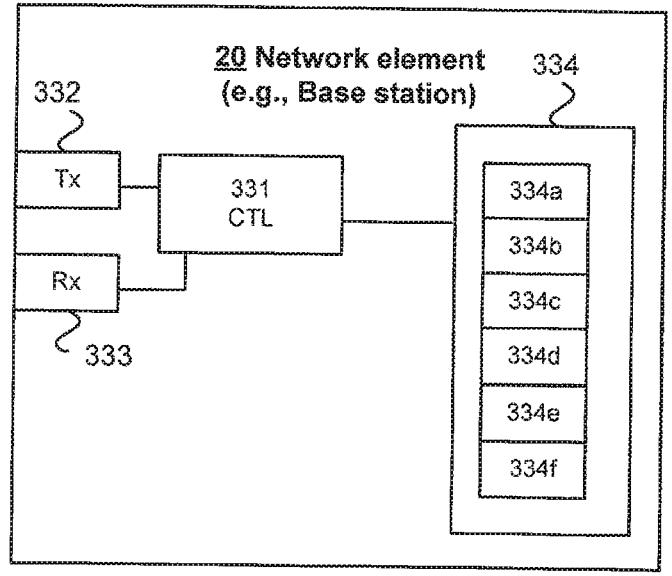
FIG. 8 is a block diagram of a network element embodied as a base station, in accordance with an example implementation.

FIG. 8 illustrates another example implementation of the network element 20. The network element 20 may comprise a processor 331 communicatively connectable to one or more modules 334. Also, a transmitter (Tx) 332 and a receiver (Rx) 333 may be provided. As can be seen in FIG. 8, a monitoring module 334a is provided for monitoring a dedicated UL channel (e.g., CBACH) to determine whether the dedicated UL channel is occupied by UL data transmissions; and a prioritization module 334b for prioritizing DL data transmissions over the dedicated UL channel in response to a determination that the dedicated UL channel is not occupied by UL transmissions. In some embodiments, the monitoring module 334a is adapted to monitor only a limited duration at the beginning of the dedicated UL channel to determine whether the dedicated UL channel is occupied by UL data transmissions. Furthermore, the network element 20 may additionally comprise a DL transmission initiating module 334c for initiating DL data transmissions over the dedicated UL channel in response to a determination that the dedicated UL channel is not occupied by UL transmissions. Still further, the transmitter 332 may be provided for transmitting DL data over the dedicated UL channel. In some embodiments, the monitoring module 334a is provided for monitoring the dedicated UL channel during a certain period of time. Also, the network element 20 may optionally comprise a DL preparation module 334d for listening to the dedicated UL channel and initiating a random backoff to prepare for DL data transmissions, in response to a determination that the dedicated UL channel is not occupied by UL transmissions during said certain period of time. Furthermore, the network element may optionally comprise a UL prioritization module 334e for prioritizing UL transmissions over the dedicated UL channel, in response to a determination that UL data is received, and a DL initiation module 334f for initiating DL data transmissions over the dedicated UL channel, in response to a determination that no UL data is received.

Figure 9:
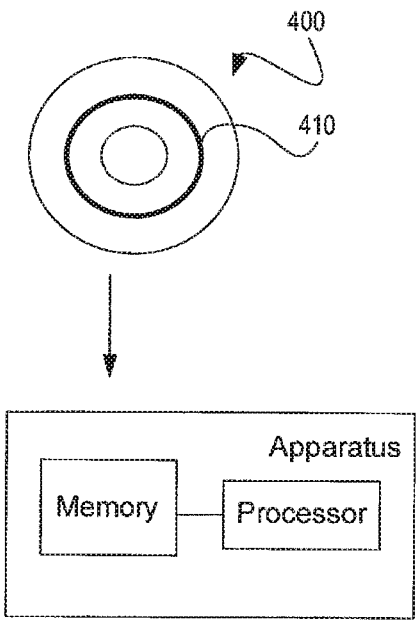
FIG. 9 illustrates a carrier including a computer program, in accordance with an embodiment.

Turning now to FIG. 9, another embodiment will be briefly discussed. FIG. 9 shows an example of a computer-readable medium, in this example in the form of a data disc 400. In one embodiment the data disc 400 is a magnetic data storage disc. The data disc 400 is configured to carry instructions 410 that can be loaded into a memory of an apparatus. Upon execution of said instructions by a processor of the apparatus, the apparatus is caused to execute a method or procedure according to any one of the embodiments described herein in conjunction with FIGS. 2-3. The data disc 400 is arranged to be connected to or within and read by a reading device (not shown), for loading the instructions into the processor. One such example of a reading device in combination with one (or several) data disc(s) 400 is a hard drive. It should be noted that the computer-readable medium can also be other mediums such as compact discs, digital video discs, flash memories or other memory technologies commonly used. In such an embodiment the data disc 400 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 10:
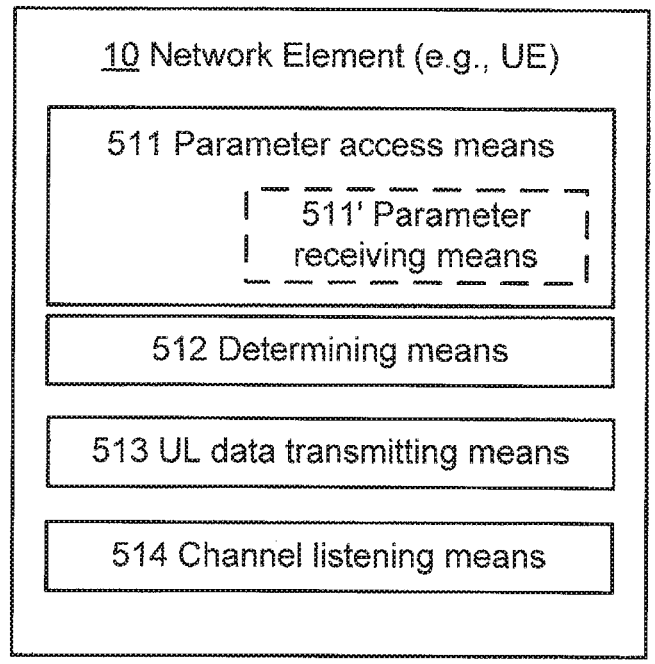
FIG. 10 is a block diagram of a network element embodied as a UE, in accordance with an embodiment.

FIG. 10 schematically illustrates a network element 10, embodied as a UE, for contention based signaling. The UE may for example comprise means 511 adapted to access configuration parameters for allowing the UE to perform contention-based signaling over a dedicated UL channel, such as CBACH. Optionally, means 511' adapted to receive the configuration parameters from a network element may (e.g., a base station) may be provided. Furthermore, the UE 10 comprises means 512 adapted to determine whether the dedicated UL channel (e.g., CBACH) is to be used for contention-based signaling. Moreover, the UE 10 comprises means 513 adapted to transmit UL data to a network element, in response to a determination that the dedicated UL channel is to be used for contention-based signaling. Still further, the network element 20 comprises means 514 adapted to initiate listening of the dedicated UL channel to determine whether DL data intended for the UE is received from the network element over the dedicated UL channel, in response to a determination that the dedicated UL channel is not to be used for contention-based signaling.

Figure 11:
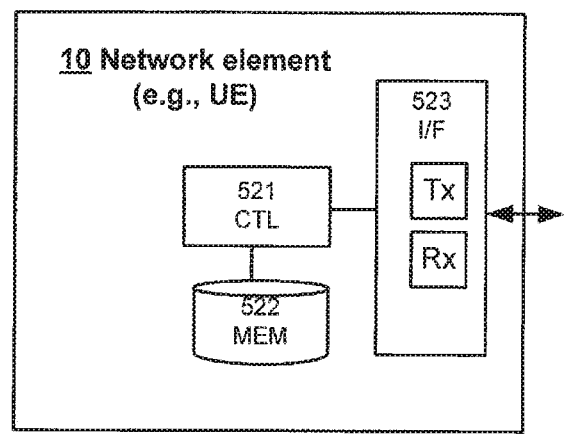
FIG. 11 is a block diagram of a network element embodied as a UE, in accordance with an example implementation.

Turning now to FIG. 11, an example implementation of a UE 10 will be described. The UE comprises at least one processor 521 and at least one memory 522, wherein the at least one memory 522 comprises instructions executable by the processor 521 whereby the UE 10 is operative to access configuration parameters for allowing the UE to perform contention-based signaling over a dedicated UL channel; determine whether the dedicated UL channel is to be used for contention-based signaling; and in response to a determination that the dedicated UL channel is to be used for contention-based signaling, transmitting UL data to a network element 20 (e.g., a network node such as a base station); else in response to a determination that the dedicated UL channel is not to be used for contention-based signaling, initiating a listening of the dedicated UL channel to determine whether DL data intended for the UE is received from the network element 20 over the dedicated UL channel. In some embodiments, the at least one memory 522 also comprises instructions executable by the processor whereby the UE 10 is operative to receive the configuration parameters from the network element 20. As described earlier, the dedicated UL channel may be Contention Based Access Channel.

Figure 12:
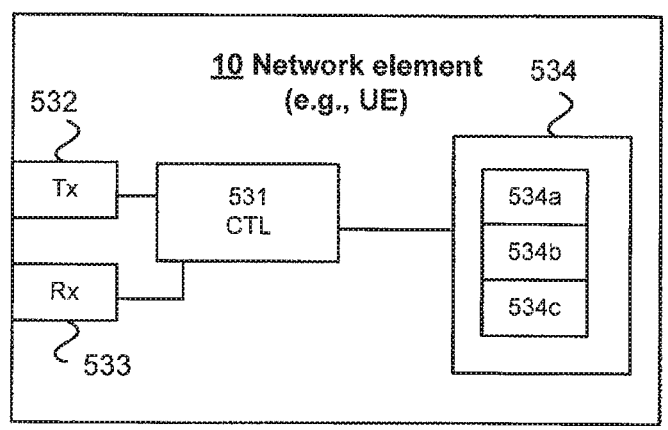
FIG. 12 is a block diagram of a network element embodied as a UE, in accordance with an example implementation.

FIG. 12 illustrates another example implementation of the UE 10. The UE 10 may comprise a processor 531 communicatively connectable to one or more modules 534. Also, a transmitter (Tx) 532 and a receiver (Rx) 533 may be provided. As can be seen in FIG. 8, a configuration module 534a is provided for accessing configuration parameters for allowing the UE to perform contention-based signaling over a dedicated UL channel. Also, the UE 10 comprises a determination module 534b for determining whether the dedicated UL channel is to be used for contention-based signaling. The transmitter 532 may be provided for transmitting UL data to a network element, in response to a determination that the dedicated UL channel is to be used for contention-based signaling. Furthermore, a channel listening module 534c may be provided for initiating a listening of the dedicated UL channel to determine whether DL data intended for the UE is received from the network element over the dedicated UL channel, in response to a determination that the dedicated UL channel is not to be used for contention-based signaling. Furthermore, the receiver 533 may be adapted to receive the configuration parameters from the network element.

Figure 13:
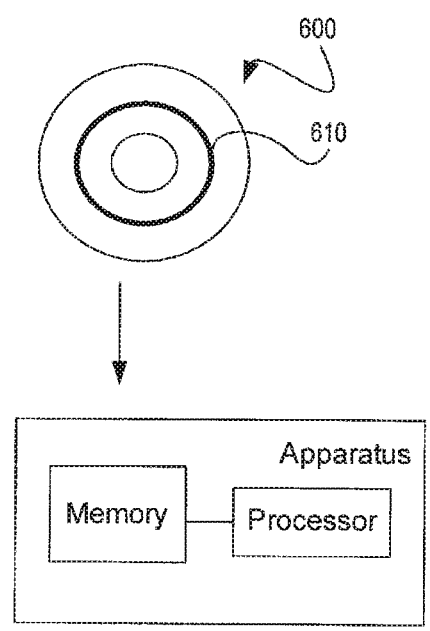
FIG. 13 illustrates a carrier including a computer program, in accordance with an embodiment.

Turning now to FIG. 13, another embodiment will be briefly discussed. FIG. 13 shows an example of a computer-readable medium, in this example in the form of a data disc 600. In one embodiment the data disc 600 is a magnetic data storage disc. The data disc 600 is configured to carry instructions 610 that can be loaded into a memory of an apparatus. Upon execution of said instructions by a processor of the apparatus, the apparatus is caused to execute a method or procedure according to any one of the embodiments described herein in conjunction with FIG. 4. The data disc 600 is arranged to be connected to or within and read by a reading device (not shown), for loading the instructions into the processor. One such example of a reading device in combination with one (or several) data disc(s) 600 is a hard drive. It should be noted that the computer-readable medium can also be other mediums such as compact discs, digital video discs, flash memories or other memory technologies commonly used. In such an embodiment the data disc 600 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

The various embodiments that have been described throughout this disclosure allow for a mechanism where UL transmission and DL transmission can co-exist over a dedicated UL channel, such as a Contention Based Access Channel (CBACH). This may extend the usage of the dedicated UL channel (e.g., the CBACH). In the existing art, the dedicated UL channel is used for UL signaling only. This disclosure recognizes the fact that, in many scenarios, no or little UL data is in fact transmitted during the entire duration of the dedicated UL channel. This typically leaves resources unused and, hence, leads to a potential waste of resources. Since embodiments described herein allow for a mechanism to prioritize between UL transmissions and DL transmissions, respectively, depending on a current UL usage of the dedicated UL channel it is made possible to improve the resource utilization of the dedicated UL channel. Hence, resource utilization in wireless communication systems may be achieved. As described earlier, this may be particularly useful in future wireless communication systems such as 5G.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method for contention based signaling of downlink, DL, data performed by a base station in a telecommunications network, the method comprising:
   transmitting configuration parameters for allowing a user equipment, UE, to perform contention based signaling over a dedicated uplink, UL, channel, wherein the configuration parameters include information about dedicated UL channel resources;
   monitoring the dedicated UL channel resources in the telecommunications network to determine whether the dedicated UL channel is occupied by UL data transmissions; and
   in response to a determination that the dedicated UL channel is not occupied by UL data transmissions, prioritizing signaling of the DL data over the dedicated UL channel resources.

2. The method according to claim 1, further comprising:
   in response to the determination that the dedicated UL channel is not occupied by UL data transmissions, initiating signaling of the DL data over the dedicated UL channel resources.

3. The method according to claim 2, further comprising:
   signaling of the DL data over the dedicated UL channel resources.

4. The method according to claim 1, wherein the monitoring of the dedicated UL channel resources comprises:
   monitoring only at the beginning of the dedicated UL channel resources to determine whether the dedicated UL channel is occupied by the UL data transmissions.

5. The method according to claim 1, wherein the monitoring of the dedicated UL channel resources is performed during a certain period of time and the method further comprises:
   in response to the determination that the dedicated UL channel is not occupied by the UL data transmissions during said certain period of time:
      listening to the dedicated UL channel resources and initiating a random backoff to prepare for signaling of the DL data; and
   in response to a determination that UL data is received, prioritizing the UL data transmissions over the dedicated UL channel resources, else
   in response to a determination that no UL data is received, initiating signaling of the DL data over the dedicated UL channel resources.

6. The method according to claim 1, wherein the dedicated UL channel is a Contention Based Access Channel, CBACH.

7. A base station for contention based signaling of downlink, DL, data in a telecommunications network, the base station comprising:
   means adapted to transmit configuration parameters for allowing a user equipment, UE, to perform the contention based signaling over a dedicated UL channel, wherein the configuration parameters include information about dedicated UL channel resources;
   means adapted to monitor the dedicated UL channel resources in the telecommunications network to determine whether the dedicated UL channel is occupied by UL data transmissions;
   means adapted to prioritize signaling of the DL data over the dedicated UL channel resources in response to a determination that the dedicated UL channel is not occupied by UL data transmissions.

8. The base station according to claim 7, further comprising:
   means adapted to signal the DL data over the dedicated UL channel resources in response to the determination that the dedicated UL channel is not occupied by UL data transmissions.

9. The base station according to claim 8, further comprising:
   means adapted to transmit the DL data over the dedicated UL channel.

10. The base station according to claim 7, wherein the means adapted to monitor the dedicated UL channel is further adapted to monitor only at the beginning of the dedicated UL channel to determine whether the dedicated UL channel is occupied by UL data transmissions.

11. The base station according to claim 10, comprising:
    means adapted to the monitor the dedicated UL channel resources during a certain period of time to determine whether the dedicated UL channel is occupied by UL data transmissions;

means adapted to listening to the dedicated UL channel resources and to initiate a random backoff to prepare for signaling of the DL data in response to the determination that the dedicated UL channel is not occupied by UL data transmissions during said certain period of time;

means adapted to prioritize UL data transmissions over the dedicated UL channel resources in response to a determination that UL data is received; and means adapted to initiate signaling of DL data over the dedicated UL channel resources in response to a determination that no UL data is received.

12. The base station according to claim 7, wherein the dedicated UL channel is a Contention Based Access Channel, CBACH.

13. A base station for contention based transmission of downlink, DL, data in a telecommunications network, the base station comprising a processor and a memory, wherein the memory comprises instructions executable by the processor whereby the base station is operative to:

transmit configuration parameters for allowing a user equipment, UE, to perform contention based signaling over a dedicated uplink, UL, channel, wherein the configuration parameters include information about dedicated UL channel resources;

monitor the dedicated UL channel in the telecommunications network to determine whether the dedicated UL channel is occupied by UL data transmissions; and in response to a determination that the dedicated UL channel is not occupied by UL transmissions, prioritize the DL data over the dedicated UL channel.

14. The base station according to claim 13, wherein the memory comprises the instructions executable by the processor whereby the base station is operative to:

in response to the determination that the dedicated UL channel is not occupied by the UL transmissions, initiate the DL data over the dedicated UL channel.

15. The base station according to claim 14, further comprising:

a transmitter adapted to transmit the DL data over the dedicated UL channel.

16. The base station according to claim 13, wherein the memory comprises the instructions executable by the processor whereby the base station is operative to:

monitor only at the beginning of the dedicated UL channel to determine whether the dedicated UL channel is occupied by the UL data transmissions.

17. The base station according to claim 13, wherein the memory comprises the instructions executable by the processor whereby the base station is operative to:

monitor the dedicated UL channel during a certain period of time; and in response to the determination that the dedicated UL channel is not occupied by UL data transmissions during said certain period of time:

listen to the dedicated UL channel and initiate a random backoff to prepare for the DL data; and in response to a determination that UL data is received, prioritize the UL data transmissions over the dedicated UL channel, else in response to a determination that no UL data is received, initiate the DL data transmissions over the dedicated UL channel.

18. The base station according to claim 13, wherein the dedicated UL channel is a Contention Based Access Channel, CBACH.

19. A base station for contention based transmission of downlink, DL, data in a telecommunications network, the base station comprising:

a transmitting module for transmitting configuration parameters for allowing a user equipment, UE, to perform contention based signaling over a dedicated uplink, UL, channel, wherein the configuration parameters include information about dedicated UL channel resources;

a monitoring module for monitoring the dedicated UL channel in the telecommunications network to determine whether the dedicated UL channel is occupied by UL data transmissions; and a prioritization module for prioritizing the DL data over the dedicated UL channel in response to a determination that the dedicated UL channel is not occupied by the UL data transmissions.

20. The base station according to claim 19, further comprising:

a DL transmission initiating module for initiating the DL data over the dedicated UL channel in response to the determination that the dedicated UL channel is not occupied by the UL data transmissions.

21. The base station according to claim 20, further comprising:

a transmitter for transmitting the DL data over the dedicated UL channel.

22. The base station according to claim 19, wherein the monitoring module is further adapted to monitor only at the beginning of the dedicated UL channel to determine whether the dedicated UL channel is occupied by the UL data transmissions.

23. The base station according to claim 19, comprising:

the monitoring module for monitoring the dedicated UL channel during a certain period of time;

a DL preparation module for listening to the dedicated UL channel and initiating a random backoff to prepare for the DL data transmissions, in response to the determination that the dedicated UL channel is not occupied by the UL data transmissions during said certain period of time:

a UL prioritization module for prioritizing the UL data transmissions over the dedicated UL channel, in response to a determination that UL data is received, and a DL initiation module for initiating DL data transmissions over the dedicated UL channel, in response to a determination that no UL data is received.

24. The base station according to claim 19, wherein the dedicated UL channel is a Contention Based Access Channel, CBACH.

25. A method of contention based transmission of downlink, DL, data in a telecommunications network comprising at least one first network element and a second network element, the method comprising:

the second network element transmitting configuration parameters for allowing a user equipment, UE, to perform contention based signaling over a dedicated uplink, UL, channel, wherein the configuration parameters include information about the dedicated UL channel resources;

the second network element monitoring dedicated UL channel resources in the telecommunications network to determine whether the dedicated UL channel is occupied by UL data transmissions from any one of the at least one first network element; and in response to a determination that the dedicated UL channel is not occupied by the UL data transmissions, the second network element prioritizing signaling of DL data to one or more of the at least one first network element over the dedicated UL channel resources.

26. A system for contention based transmission of downlink, DL, data, the system comprising at least one first network element and a second network element in a telecommunications network, wherein:

the second network element is adapted to transmit configuration parameters for allowing a user equipment, UE, to perform contention based signaling over a dedicated uplink, UL, channel, wherein the configuration parameters include information about the dedicated UL channel resources;

the second network element is adapted to monitor dedicated UL channel resources in the telecommunications network to determine whether the dedicated UL channel is occupied by UL data transmissions from any one of the at least one first network element; and in response to a determination that the dedicated UL channel is not occupied by the UL data transmissions, the second network element is adapted to prioritize signaling of DL data to one or more of the at least one first network element over the dedicated UL channel resources.

27. The system according to claim 26, wherein the at least one first network element comprises at least one user equipment, UE, and wherein the second network element is a base station.

* * * * *